United States Patent
Lu et al.

(10) Patent No.: US 8,305,784 B2
(45) Date of Patent: Nov. 6, 2012

(54) HIGH EFFICIENCY UNIVERSAL INPUT SWITCHING POWER SUPPLY WITH SWITCHABLE PFC CIRCUITS

(75) Inventors: Qun Lu, Tamshui Chen (TW); You-Yi Zuo, Tamshui Chen (TW); Wei-Liang Lin, Tamshui Chen (TW)

(73) Assignee: Acbel Polytech Inc., Taipei Hsien (TW)

( * ) Notice: Subject to any disclaimer, the term of this patent is extended or adjusted under 35 U.S.C. 154(b) by 444 days.

(21) Appl. No.: 12/587,394

(22) Filed: Oct. 6, 2009

(65) Prior Publication Data
US 2010/0165679 A1 Jul. 1, 2010

(30) Foreign Application Priority Data
Dec. 26, 2008 (TW) ................................. 97151162 A

(51) Int. Cl.
*H02J 1/10* (2006.01)
(52) U.S. Cl. ....................................................... 363/65
(58) Field of Classification Search .................. 323/267, 323/269, 271, 272; 363/34, 37, 67, 69–71, 363/73, 89, 97, 98, 65
See application file for complete search history.

(56) References Cited

U.S. PATENT DOCUMENTS

| | | | | |
|---|---|---|---|---|
| 5,398,182 A * | 3/1995 | Crosby | | 363/89 |
| 5,612,581 A * | 3/1997 | Kageyama | | 307/64 |
| 5,894,414 A * | 4/1999 | Jiang | | 363/65 |
| 6,714,425 B2 * | 3/2004 | Yamada et al. | | 363/21.12 |
| 6,842,353 B2 * | 1/2005 | Yamada et al. | | 363/89 |
| 7,888,917 B2 * | 2/2011 | Olson | | 323/222 |
| 2003/0090916 A1 * | 5/2003 | Thrap | | 363/67 |
| 2004/0213025 A1 * | 10/2004 | Elek et al. | | 363/70 |
| 2005/0052222 A1 * | 3/2005 | Ootani et al. | | 327/536 |
| 2008/0130336 A1 * | 6/2008 | Taguchi | | 363/125 |
| 2010/0090627 A1 * | 4/2010 | Ting | | 318/376 |

* cited by examiner

*Primary Examiner* — Gary L Laxton
*Assistant Examiner* — Gary Nash
(74) *Attorney, Agent, or Firm* — William E. Pelton, Esq.; Cooper & Dunham LLP

(57) ABSTRACT

A universal input switching power supply has a signal detecting unit, two DC converting units and a physical wiring and controlling unit. The DC converting units are respectively adapted to couple to an AC power source to convert the AC power source to two first DC power sources and changes a voltage of each of the first power sources according to different voltage of the AC power source. The physical wiring and controlling unit is connected to the outputs of the DC converting units and the signal detecting unit and automatically connects the outputs of the PFC circuits in parallel if a high line voltage range of the AC power source is coupled to the full bridge rectifier. On the contrary, the physical wiring and controlling unit automatically connects the outputs of the PFC circuits in serial. Accordingly, the universal input switching power supply has good transmitting efficiency at different AC power source conditions.

17 Claims, 7 Drawing Sheets

HIGH EFFICIENCY UNIVERSAL INPUT SWITCHING POWER SUPPLY WITH SWITCHABLE PFC CIRCUITS

BACKGROUND OF THE INVENTION

1. Field of the Invention

The present invention is related to a universal input switching power supply, and more particularly to a high efficiency universal input switching power supply.

2. Description of the Related Art

The universal input switching power supply may use a high line voltage range (185V to 265V) of an AC power source or a low line voltage range (90V to 130V) of an AC power source and provides a constant output voltage of a DC power source. Every country sets a normal high and low line voltages of the AC power, for example, in Taiwan, the normal high line voltage is 220 ACV and the normal low line voltage is 110 ACV.

With reference to FIG. 4, a conventional universal input switching power supply mainly has a full bridge rectifier (50), a power factor corrector (hereinafter PFC) circuit (51) and a DC to DC converting circuit (52). The full bridge rectifier (50) is coupled to the external AC power source (AC IN) and converts the AC power source (AC IN) to a first DC power source. Since the PFC circuit (51) is connected to the full bridge rectifier (50), a voltage of the first DC power source is boosted to a second DC power source with higher voltage if the PFC circuit (51) uses a structure of a boost converter. On the contrary, the voltage of the first DC power is decreased when the PFC circuit (51) uses a structure of a buck converter. Using the boost converter as the PFC circuit (51) for an example, a PFC controller (511) of the PFC circuit (51) drives a first power switch (S1) to turn on or off by outputting a PWM signal. The voltage of the second DC power source from the PFC circuit (51) will be close to 400V. The 400V of the voltage of the second DC power source is further supplied to the DC to DC converting circuit (52). A PWM controller (521) of the DC to DC converting circuit (52) outputs a PWM signal to a second power switch (S2) to adjust current value of a primary side of a transformer (522). Pulse widths of the PWM signal from the DC to DC converting circuit (52) is modulated according to an output voltage ($V_O$) of the universal input switching power supply. Therefore, the DC to DC converting circuit (52) stabilizes the output voltage ($V_O$) of the universal input switching power supply at different voltages of the AC power source conditions.

The PFC circuit (51) of the above universal input switching power supply outputs 400V of the voltage of the second DC power source to the DC to DC converting circuit (52) when the universal input switching power supply is coupled to 220V AC power source (AC IN). Therefore, the DC to DC converting circuit (52) converts the 400V of the voltage of the second DC power source to a 12V or 5V of a voltage of a third DC power source. However, a transmitting efficiency of the universal switching power is not good, especially coupling to 110V AC power source (AC IN). That is, the PFC circuit (51) has to converts the 220V or 110V of the voltage of the AC power source to 400V DC power source. In general, the PFC controller (51) using the structure of the boost converter has about 96% transmitting efficiency at using 220V AC power source condition. However, the PFC controller (51) modulates a large pulse width of the PWM signal to the first power switch (S1) to output 400V DC power source when the universal input switching power supply is coupled to the 110V AC power supply. Therefore, a conductive term of the first power switch (S1) is increased, a conductive resistor of the first power switch (S1) consumes more energy of the AC power source.

Accordingly, an transmitting efficiency of the PFC circuit (51) coupled to the 110V AC power source is decreased to about 94% that is lower than that of the PFC circuit coupled to the 220V AC power source.

Another type of the universal input switching power supply, a PFC circuit uses a structure of a buck converter. The PFC circuit outputs 80V of the voltage of the second DC power source to a DC to DC converting circuit. A transformer of the DC to DC converting circuit is smaller than that of the above DC to DC converting circuit for boost converter. Therefore, the universal switching power efficiency is also not good, especially coupling to the high voltage of the AC power source. In general, the PFC circuit has to convert the 220V or 110V of the voltage of the AC power source to 80V of the DC power source through the full bridge rectifier. The PFC controller using the structure of the buck converter has 96% transmitting efficiency at using 110V AC power source condition. On the contrary, an transmitting efficiency of the PFC circuit coupled to the 220V AC power source is about 94% and is lower than that of the PFC circuit coupled to the 110V AC power source.

Based on foregoing description, each of the universal switching power supplies can not provide good transforming efficiency for different voltages of the AC power sources.

To overcome the shortcomings, the present invention provides a universal input switching power supply to mitigate or obviate the aforementioned problems.

SUMMARY OF THE INVENTION

An objective of the present invention is to provide a universal input switching power supply automatically changes a physical circuit thereof for different AC power source to increase the whole transmitting efficiency.

The universal input switching power supply has a signal detecting unit, two DC converting units and a physical wiring and controlling unit. The DC converting units are respectively adapted to couple to an AC power source to convert the AC power source to two first DC power sources and changes a voltage of each of the first power sources according to different voltage of the AC power source. The physical wiring and controlling unit is connected to the outputs of the DC converting units and the signal detecting unit and automatically connects the outputs of the PFC circuits in parallel if a high line voltage range of the AC power source is coupled to the full bridge rectifier. On the contrary, the physical wiring and controlling unit automatically connects the outputs of the PFC circuits in series. Accordingly, the universal input switching power supply has good transmitting efficiency at different AC power source conditions.

Other objectives, advantages and novel features of the invention will become more apparent from the following detailed description when taken in conjunction with the accompanying drawings.

DETAILED DESCRIPTION OF THE INVENTION

Figure 1:
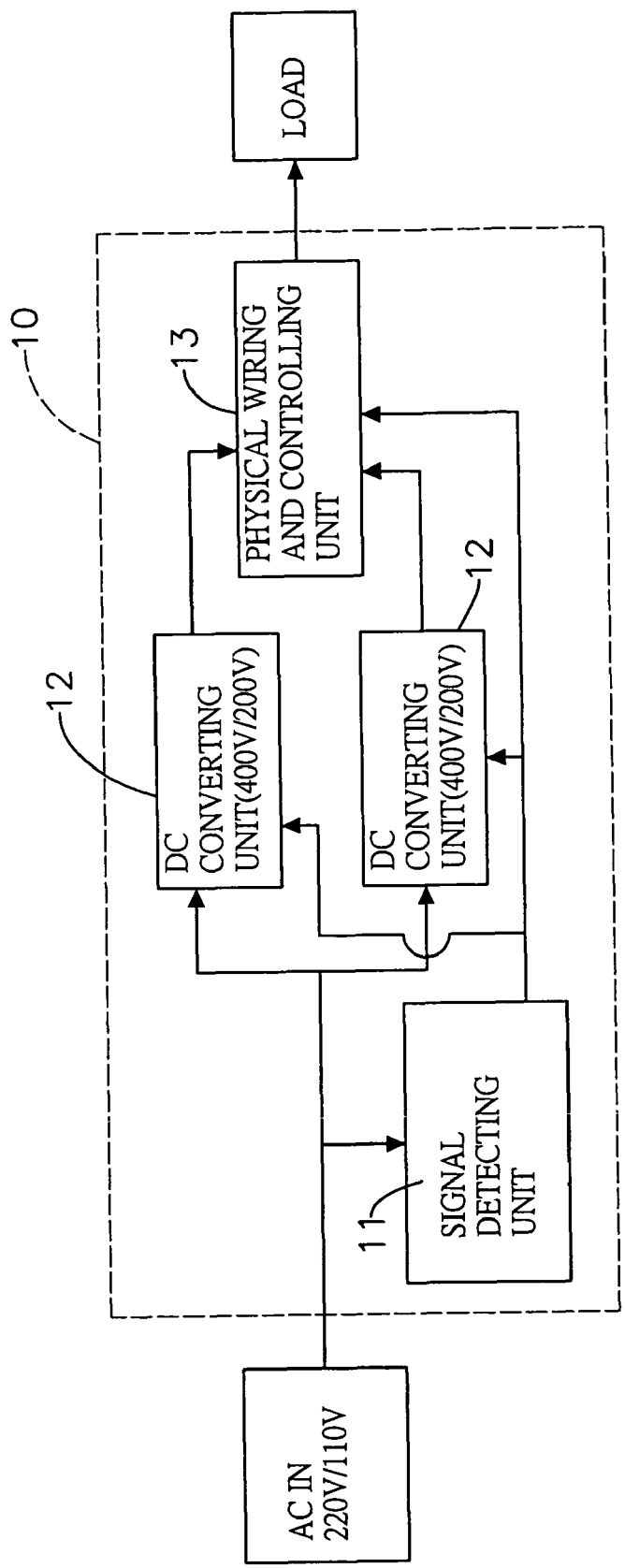
FIG. 1 is a block diagram of a universal input switching power supply in accordance with the present invention.

With reference to FIG. 1, a universal input switching power supply (10) has a signal detecting unit (11), two DC converting units (12) and a physical wiring and controlling unit (13).

The two DC converting units (12) are coupled to an external AC power source and convert the AC power source to two first DC power sources ($V_A$). A voltage of each of the first DC power sources is changed according to different voltage of the AC power source to which the universal input switching power supply (10) currently is connected. The signal detecting unit (11) is connected to the AC power source to determine the voltage of the AC power source to which the universal input switching power supply (10) currently connected and outputs a detecting signal to the two DC converting units (12).

The physical wiring and controlling unit (13) is connected to the two DC converting units (12) and the signal detecting unit (11). The physical wiring and controlling unit (13) automatically changes wiring of outputs of the DC converting units (12) according the detecting signal from the signal detecting unit (11). The physical wiring and controlling unit (13) physically changes the wiring of the outputs of the DC converting units (12) in series or parallel. Accordingly, an output voltage of the universal input switching power supply (10) is constant even if the voltage of the second DC power source is changed according to the different voltages of the AC power sources.

Figure 2A:
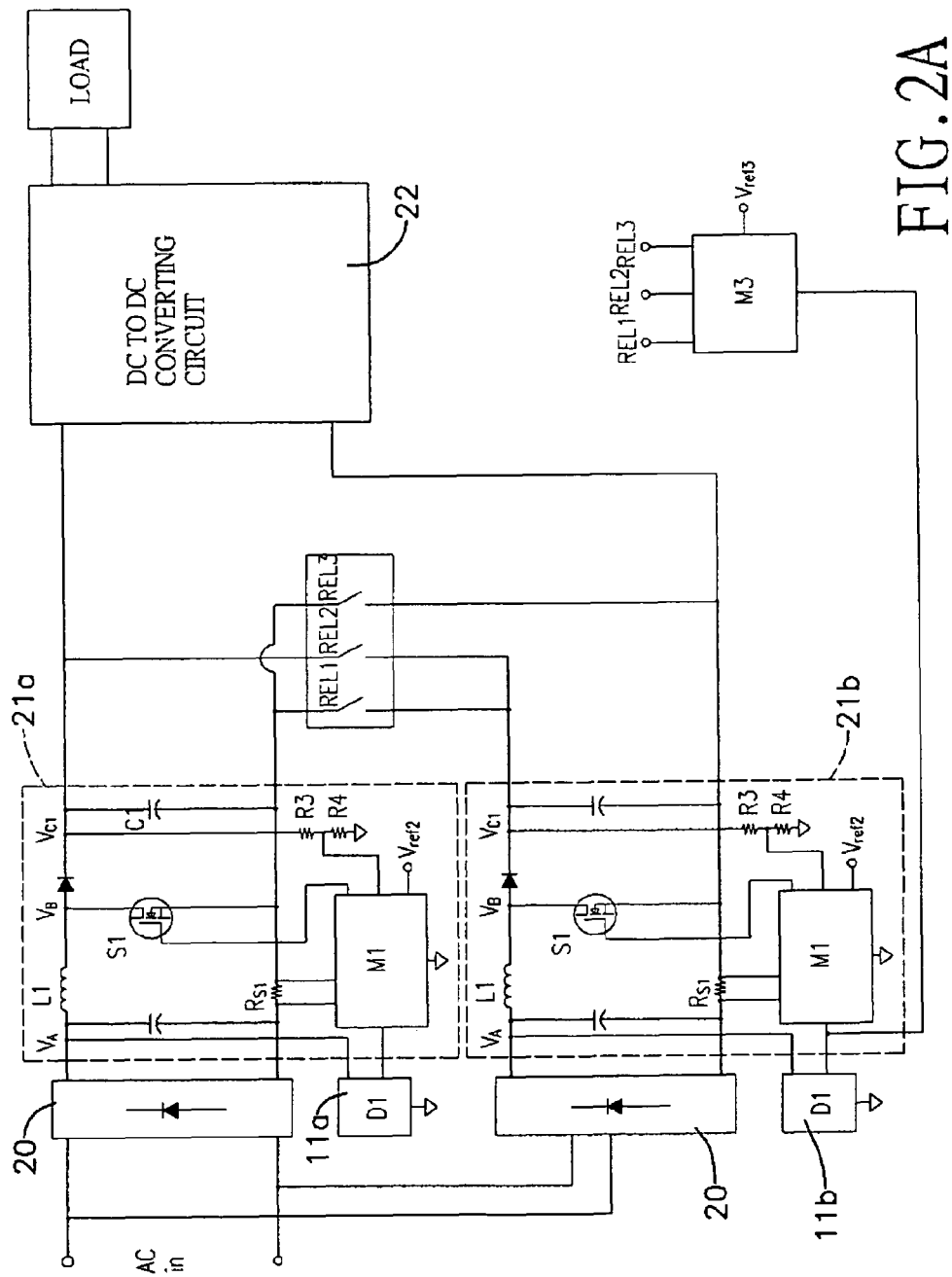
FIG. 2A is a detailed circuit diagram of the universal input switching power supply of FIG. 1.

With further reference to FIG. 2A, a preferred embodiment of the universal input switching power supply in accordance with the present invention is shown. The DC converting units (12) has two full bridge rectifiers (20), two power factor corrector (hereinafter PFC) circuits (21a, 21b) and a DC to DC converting circuit (22).

The full bridge rectifiers (20) are respectively coupled to the external AC power source and rectify the AC power source to the first DC power sources ($V_A$). An output of each of the two full bridge rectifiers (20) outputs the first DC power source ($V_A$).

Figure 2B:
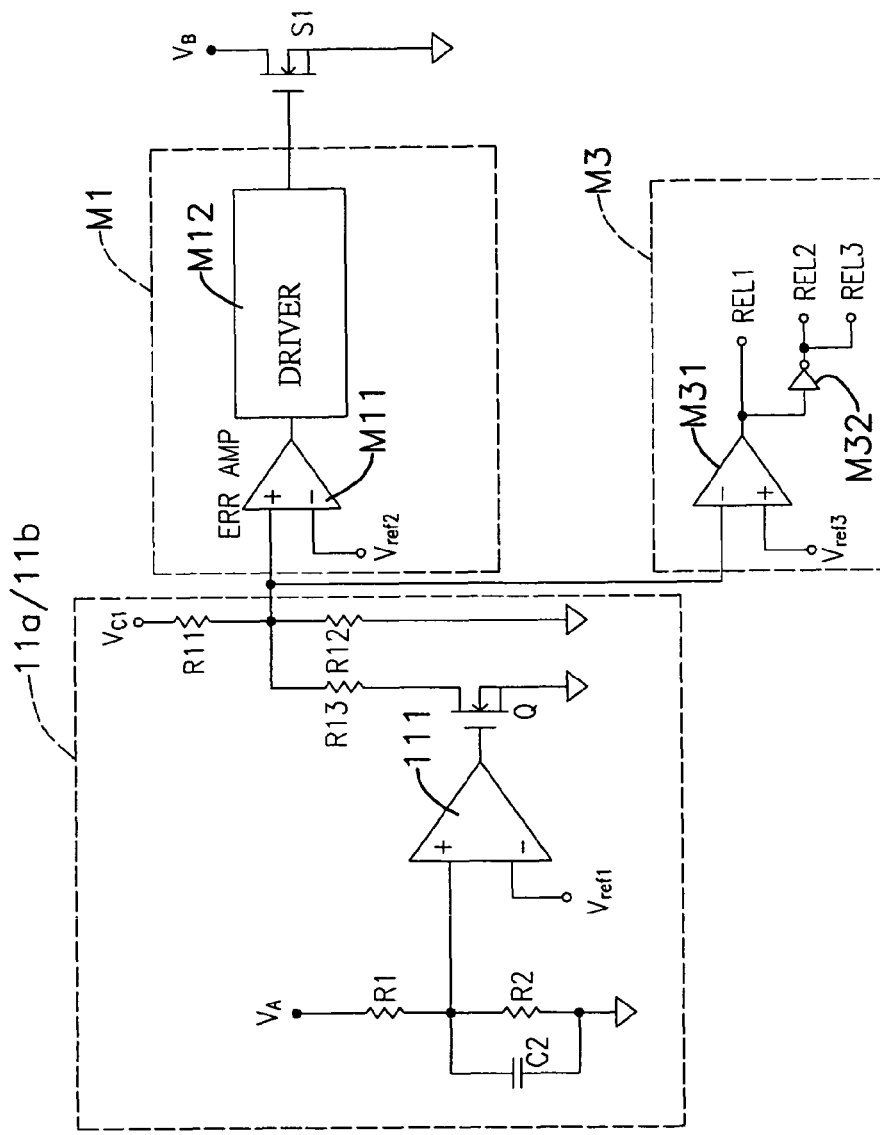
FIG. 2B is a detailed circuit diagram of a partial circuit of the universal input switching power supply of FIG. 2A.

In the preferred embodiment, each of the two PFC circuits (21a, 21b) uses a structure of a boost converter having an inductor (L1), a storage capacitor (C1), a first power switch (S1), a PFC controller (M1) and an output voltage feedback unit (R3, R4). One end of the inductor (L1) is connected to the output of the full bridge rectifier (20). The storage capacitor (C1) is connected to the other end of the inductor (L1) and the ground. The first power switch (S1) is connected between a connecting node of the inductor (L1) and the storage capacitor (C1), and the ground. The first power switch (S1) has a controlling terminal. The PFC controller (M1) is connected to the controlling terminal of the first power switch (S1) and the signal detecting unit (11) and outputs a first PWM signal to the controlling terminal of the first power switch (S1). The first power switch (S1) turns on or off according to the first PWM signal. With further reference to FIG. 2B, the PFC controller (M1) has an error amplifier (M11), a second referenced voltage ($V_{ref2}$) and a driver (M12). The error amplifier (M11) has two input terminals (+, −). One (−) of the two input terminals is connected to the second referenced voltage ($V_{ref2}$) and the other (+) is connected to the signal detecting unit (11). The output terminal of the error amplifier (M11) is connected to the driver (M12) and the driver (M12) is connected to the controlling terminal of the first power switch (S1). The output voltage feedback unit (R3, R4) is connected to the storage capacitor (C1) and the PFC controller (M1) to feedback a voltage of the storage capacitor (C1) to the PFC controller (M1). The PFC controller (M1) modulates pulse widths of the first PWM signal according to the feedback voltage from the output voltage feedback unit (R3, R4) and the detecting signal from the signal detecting unit (11). The output voltage feedback unit (R3, R4) is a voltage divider.

The DC to DC converting circuit (22) is connected to the two PFC circuits (21a, 21b) through the physical wiring and controlling unit (13). In the preferred embodiment, the DC to DC converting circuit (22) is connected to the output of one (21a) of the PFC controlling units and the ground of the other PFC controlling unit (21b).

The signal detecting unit (11) has two voltage detectors (11a, 11b) connected to corresponding the PFC controllers (M1) of the PFC circuits (21a, 21b). Each of the voltage detectors (11a, 11b) has a low pass filter (C2, R1, R2), a comparator (111), an electronic switch (Q) and a voltage divider (R11, R12).

The low pass filter (C2, R1, R2) is connected to the output ($V_A$) of the corresponding full bridge rectifier (20). An output voltage of the low pass filter (C2, R1, R2) changes according to the AC power.

The comparator (111) has two inputs (+, −) and an output. One (+) of the two inputs is connected to the low pass filter (C2, R1, R2) and the other input (−) is connected to a first referenced voltage ($V_{ref1}$).

The electronic switch (Q) has a controlling terminal connected to the output of the comparator (111).

The voltage divider (R11, R12) is connected to the storage capacitor (C1) and the ground of the corresponding PFC circuit (21a, 21b). The voltage divider (R11, R12) has a first and second resistors (R11, R12) connected together in series. A serial connecting node of the first and second resistors (R11, R12) of the voltage divider is connected to the electronic switch (Q) through a serial resistor (R13) and connected to one input terminal (+) of the error amplifier (M11) of the PFC controller (M1) of the corresponding PFC circuit (21a, 21b). Since the output voltage feedback unit (R3, R4) is a voltage divider and is also connected to the storage capacitor (C1), the voltage divider (R11, R12) of the voltage detector (11a, 11b) is replaced to the output voltage feedback unit (R3, R4) of the PFC controller (M1).

When the full bridge rectifier (20) is coupled to a 220V AC power source, the comparator (111) of the voltage detector (11a, 11b) outputs high potential signal to the electronic switch (Q) by comparing the output voltage of the low pass filter (C2, R1, R2) and the first referenced voltage ($V_{ref1}$). And then the electronic switch (Q) turns on. At the time, the serial resistor (R13) is connected to the second resistor (R12) of the voltage divider of the voltage detector in parallel. Therefore, a voltage of the input terminal (+) of the error amplifier (M11) is decreased. The error amplifier (M11) outputs a low potential signal to the driver (M12). The driver (M12) modulates the pulse widths of the PWM signal to boost the voltage of the storage capacitor (C1) to 400V second DC power source ($V_{C1}$). On the contrary, when the full bridge rectifier (20) is coupled to an 110V AC power source, the comparator (111) of the voltage detector (11a, 11b) outputs low potential signal to the electronic switch (Q) and then the electronic switch (Q) turns off. At the time, the serial resistor (R13) is not connected to the second resistor (R12) of the voltage divider (11a, 11b) in parallel. Therefore, the voltage of the input terminal (+) of the error amplifier (M11) is increased. The error amplifier (M11) outputs a high potential signal to the driver (M12). The driver (M12) modulates the pulse widths of the PWM signal to boost the voltage of the storage capacitor (C1) to 200V second DC power source ($V_{C1}$).

Based on foregoing description, the PFC circuit (21a, 21b) outputs 400V second DC power source ($V_{C1}$) when the universal input switching power supply is coupled to the 220V AC power source. On the contrary, the PFC circuit (21a, 21b) outputs the 200V second DC power source ($V_{C1}$) when the 110V AC power source. Therefore, the PFC circuit (21a, 21b) changes output voltage according to voltage of the AC power source through the voltage detector (11a, 11b).

The physical wiring and controlling unit (13) is connected between the outputs of the two PFC circuits (21a, 21b) and the DC to DC converting circuit (22). The physical wiring and controlling unit (13) has a first electric switch (REL1), a second electric switch (REL2), a third electric switch (REL3) and a processor (M3).

The first electric switch (REL1) is connected to the ground of one (21a) of the PFC controlling unit and the output of the other PFC controlling unit (21b). The second electric switch (REL2) is connected to the outputs of the PFC circuits (21a, 21b). The third electric switch (REL3) is connected to the grounds of the PFC circuits (21a, 21b).

Figure 2C:
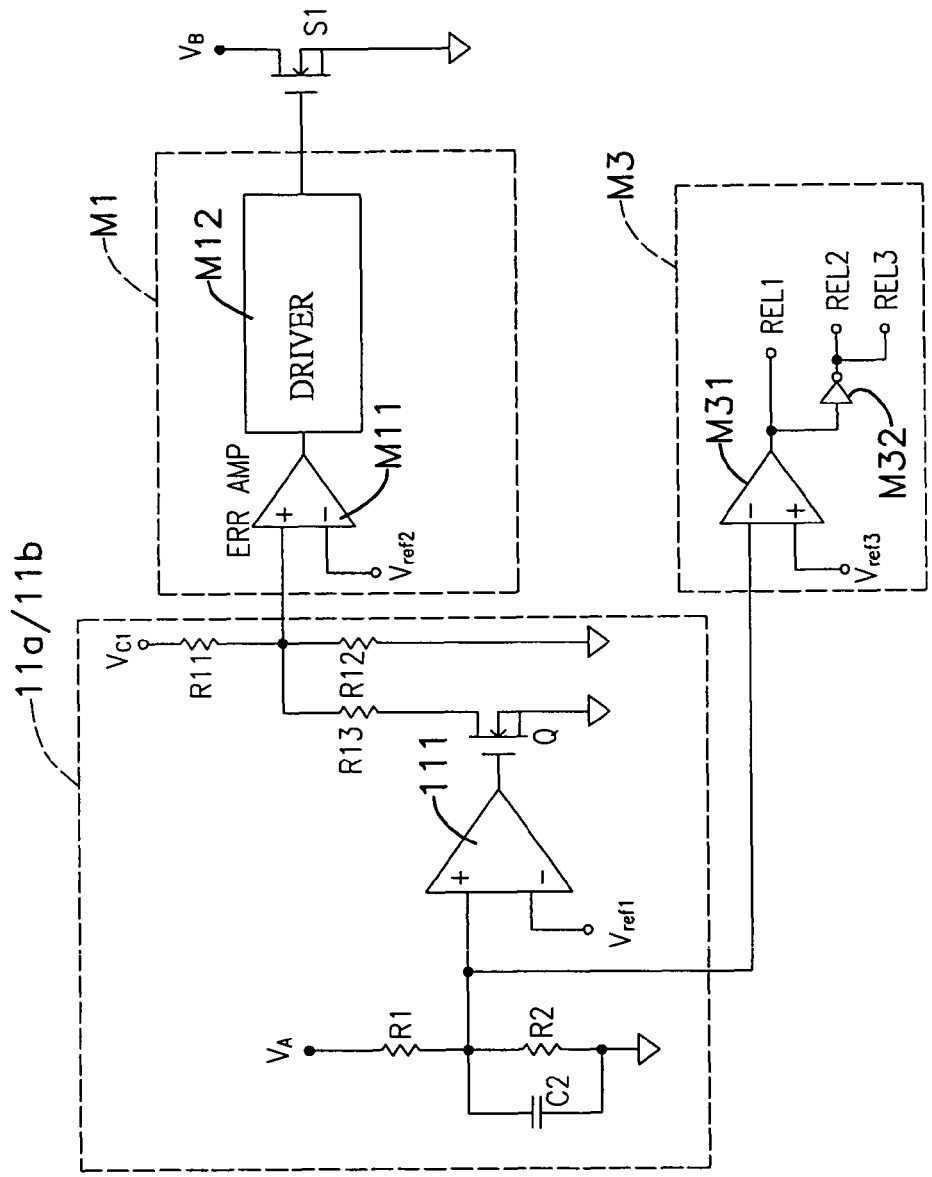
FIG. 2C is another detailed circuit diagram of a partial circuit of the universal input switching power supply of FIG. 2A.

The processor (M3) is connected to one (11b) of the voltage detectors of the signal detecting unit (11), a third referenced voltage ($V_{ref3}$) and the first to third electric switches (REL1 to REL3) The processor (M3) has a comparator (M31) and an inverter (M32). The comparator (M31) has two inputs (+, −) and an output. The two inputs (−, +) of the comparator (M31) are respectively connected to the serial connecting node of the voltage divider (R11, R12) of the voltage detector (11b) and the third referenced voltage ($V_{ref3}$). The output of the comparator (M31) is connected to the first electric switch (REL1) and connected to the second and third electric switches (REL2, REL3) through the inverter (M32). Each of the first to third electric switches (REL1 to REL3) may be a relay. With reference to FIG. 2C, the two inputs (−, +) of the comparator (M31) are also respectively connected to the low pass filter (C2, R1, R2), since the output voltage of the low pass filter (C2, R1, R2) changes according to the AC power.

Figure 3A:
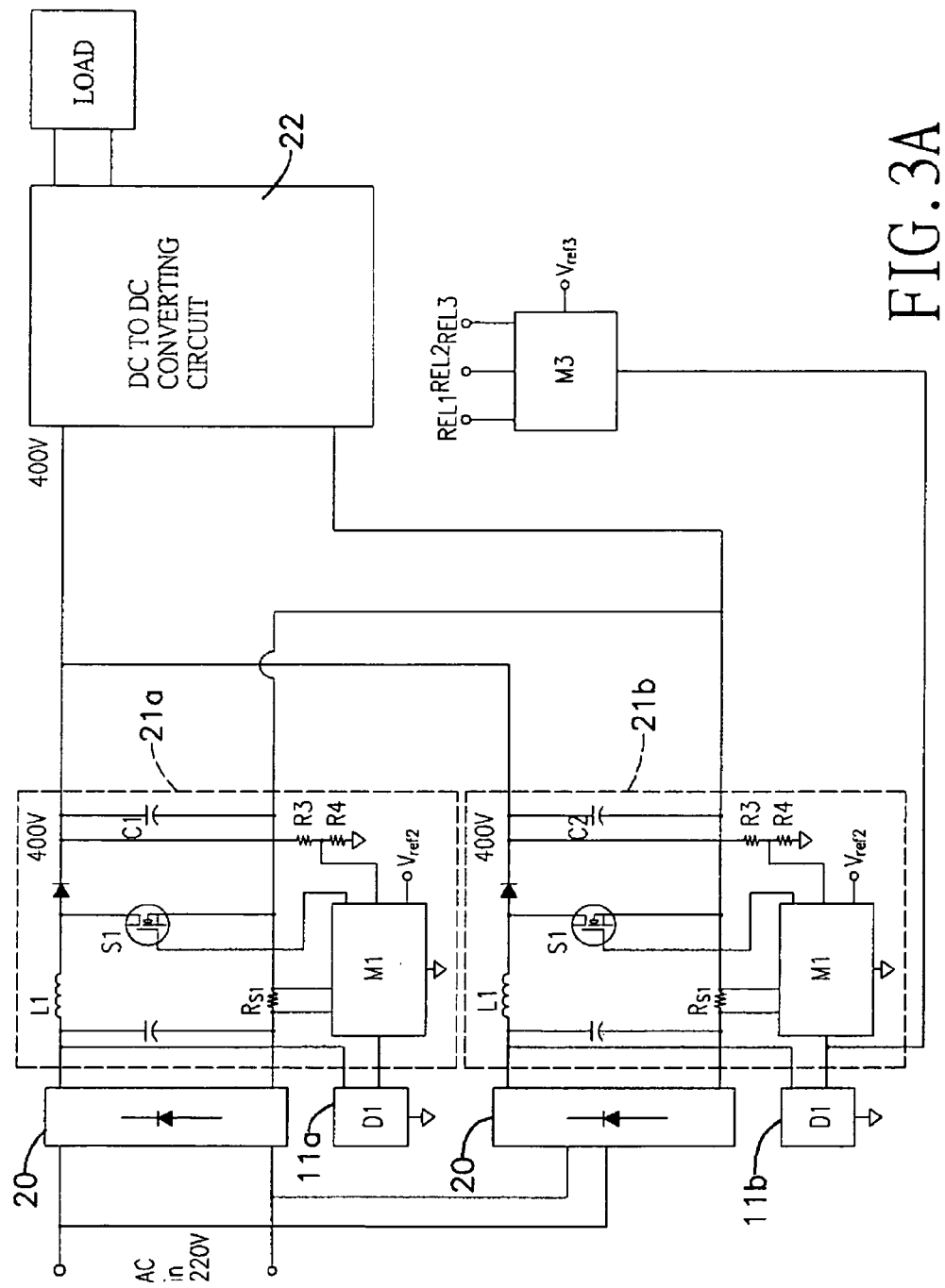
FIG. 3A is an equivalent circuit diagram of the universal input switching power supply coupled to a high line voltage range of the universal input switching power supply.

When the universal input switching power supply is coupled to 220V AC power source, the voltage detector (11a, 11b) outputs a low potential signal to the comparator (M31) of the processor (M3). Then the comparator (M31) drives the first electric switch (REL1) to turn off and the second and third electric switches (REL2, REL3) turn on. With further reference to FIG. 3A, the two outputs and the grounds of the PFC circuits (21a, 21b) are connected in parallel. Therefore, the 400V second DC power source ($V_{C1}$) is supplied to the DC to DC converting circuit (22).

Figure 3B:
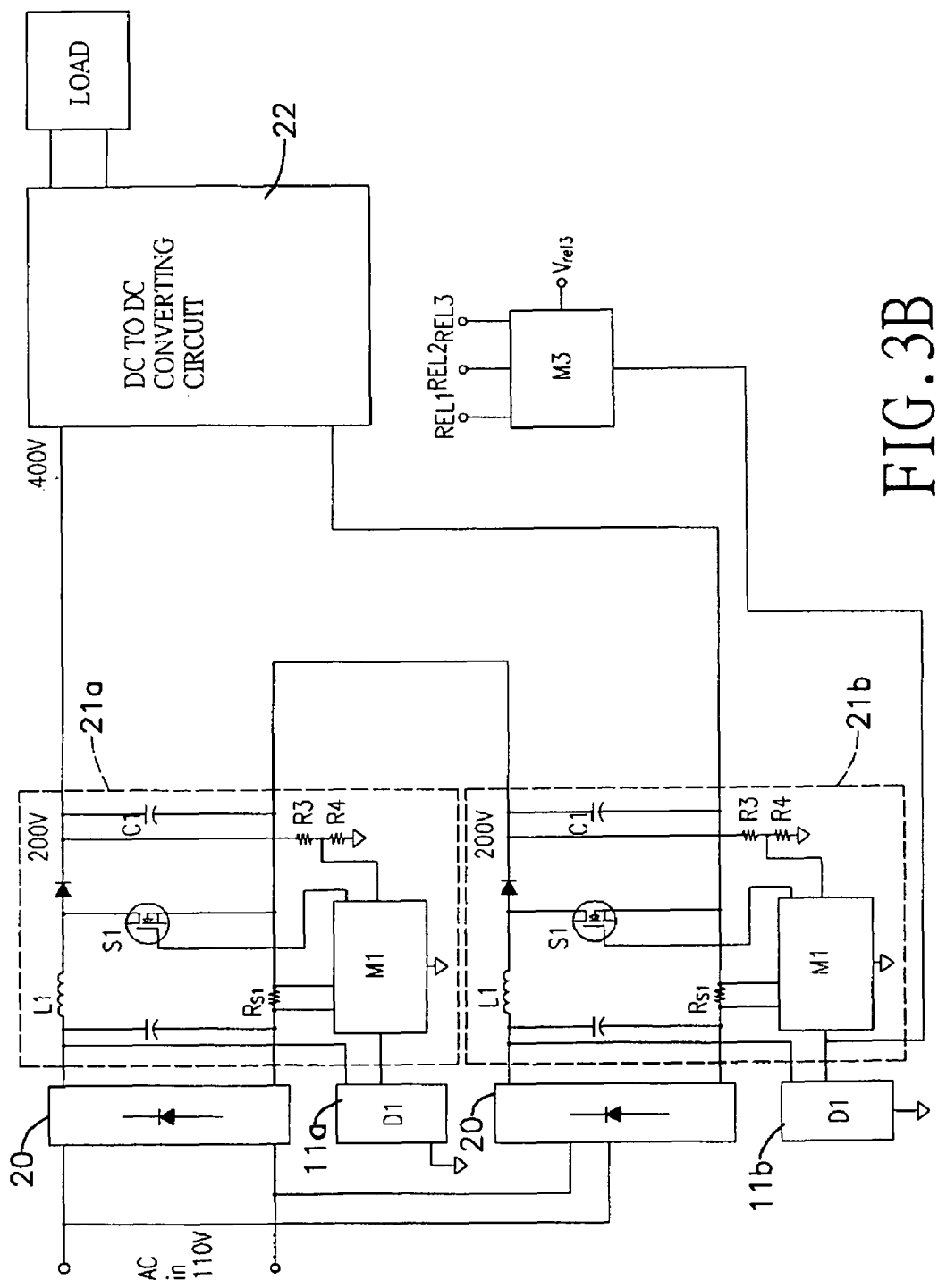
FIG. 3B is an equivalent circuit diagram of the universal input switching power supply coupled to a low line voltage range of the universal input switching power supply.
Figure 4:
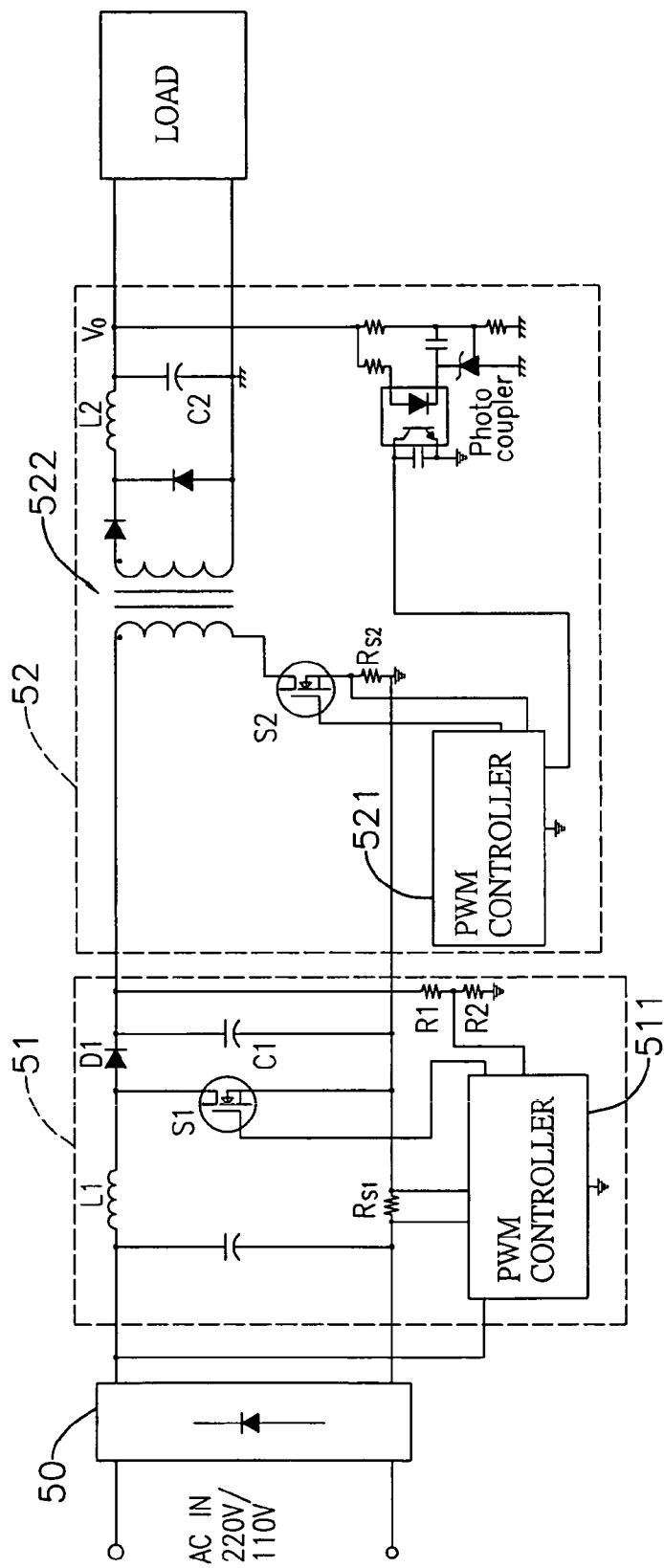
FIG. 4 is a detailed circuit diagram of a conventional universal input switching power supply in accordance with the prior art.

When the universal input switching power supply is coupled to the 110V AC power source, the voltage detector (11a, 11b) outputs a high potential signal to the comparator (M31) of the processor (M3). Then the comparator (M31) drives the first electric switch (REL1) to turn on and the second and third electric switches (REL2, REL3) turn off. With further reference to FIG. 3B, the ground of one (21a) of the PFC circuits is connected to the output of the other PFC circuit (21b), so two outputs of the PFC circuits (21a, 21b) are connected in series. The 200V second DC power sources ($V_{C1}$) from the PFC circuits (21a, 21b) are added to 400V DC power source supplied to the DC to DC converting circuit (22).

The processor (M3) controls the first to third electric switches (REL1 to REL 3) to turn on or off according to following logic list:

| AC power source | $1^{st}$ electric switch | $2^{nd}$ electric switch | $3^{rd}$ electric switch |
|---|---|---|---|
| High line voltage range (220 V) | OFF | ON | ON |
| Low line voltage range (110 V) | ON | OFF | OFF |

Based on the foregoing description, the PFC circuit (21a, 21b) only boosts 110V AC power source to 200V second DC power source ($V_{C1}$). Then, the physical wiring and controlling unit (13) automatically connected two outputs of the PFC circuits (21a, 21b) in series to output the DC to DC converting circuit (22) the 400V DC power source. Therefore, the circuit of the DC to DC converting circuit is not needed to change and the transmitting efficiency of the PFC circuit is increased to 96% at using 100V AC power source condition.

In another preferred embodiment, each of two PFC circuits uses a structure of a buck converter. Since the buck converter has a controller, a voltage detector is also connected to the controller. The buck converter outputs 80V or 160V of a voltage of a DC power source to a DC to DC converting circuit according to different voltages (110V or 220V) of the AC power sources. When the universal input switching power supply is coupled to the high voltage (220V) of the AC power source, two PFC circuits respectively output two 160V second DC power sources. At the time, a processor of a physical wiring and controlling unit drives a first electric switch to turn off and a second and third electric switches to turn on. Therefore, the outputs of the PFC circuits are connected in parallel, the 160V second DC power source is supplied to the DC to DC converting circuit. When the universal input switching power supply is coupled to the low voltage (110V) of the AC power source, two PFC circuits respectively output two 80V second DC power sources. At the time, a processor of a physical wiring and controlling unit drives a first electric switch to turn on and a second and third electric switches to turn off. Therefore, the outputs of the PFC circuits are connected in serial, the 160V DC power source is supplied to the DC to DC converting circuit.

Based on the foregoing description, the PFC circuit using the structure of the buck convert only converts 220V of the voltage of the AC power source to 160V of the voltage of the DC power source. Therefore, the circuit of the DC to DC converting circuit is not needed to change and the transmitting efficiency of the PFC circuit is increased to 96% when the universal input switching power supply is coupled to 220V of the voltage of the AC power source.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A universal input switching power supply comprising:
a signal detecting unit coupled to an external AC power source to detect a high or low line voltage of the AC power source and outputting a detecting signal corresponding to the high or low line voltage of the AC power source;
two DC converting units respectively coupled to the AC power source to convert the AC power source to two first DC power sources, wherein a voltage of each of the first power sources is changed according to the detecting signal, wherein each of the two DC converting units has:
a full bridge rectifier coulped to the AC power source; and
a PFC circuit connected to the full bridge rectifiers, outputting the first DC power source; and
a physical wiring and controlling unit connected to the two PFC circuits of the two DC converting units and the signal detecting unit, automatically changing wiring of outputs of the two PFC circuits of the two DC converting units according to the detecting signal from the signal detecting unit, wherein
the outputs of the two PFC circuits of the two DC converting units are connected in parallel to outputs a second DC power source, if the detecting signal is corresponding to the high line voltage range, wherein the second DC power source is equal to each of the two first DC power sources; and
the outputs of the two PFC circuits of the two DC converting units are connected in series to outputs a third DC power source, if the detecting signal is corresponding to the low line voltage range, wherein the third DC power source is equal to a sum of the two first DC power sources.

2. The universal input switching power supply as claimed in claim 1, further comprises:
a DC to DC converting circuit connected to the outputs of the two PFC circuits through the physical wiring to convert the second or third DC power sources to a fourth power source.

3. The universal input switching power supply as claimed in claim 1, wherein each of the two PFC circuits uses a boost converter.

4. The universal input switching power supply as claimed in claim 1, wherein each of the two PFC circuits uses a buck converter.

5. The universal input switching power supply as claimed in claim 3, wherein each of the two PFC circuits further comprises:
an inductor having two ends, one end thereof connected to the corresponding full bridge rectifier;
a storage capacitor connected to the other end of the inductor, a ground and the corresponding output connected to the physical wiring and controlling unit;
a first power switch connected between a connecting node of the inductor and the storage capacitor and the ground, and having a controlling terminal;
a PFC controller connected to the controlling terminal of the first power switch and the signal detecting unit, and outputting a first PWM signal to the controlling terminal of the first power switch; and
an output voltage feedback unit connected to the storage capacitor and the PFC controller to feedback a voltage of the storage capacitor to the controller, wherein the PFC controller modulates pulses of the first PWM single according to the feedback voltage from the output voltage feedback unit and the detecting signal from the signals detecting unit.

6. The universal input switching power supply as claimed in claim 5, wherein the controller comprises:
an error amplifier having:
two input terminals, one input terminal thereof connected to the signal detecting unit; and
an output terminal;
a second referenced voltage connected to the other input terminal of the error amplifier; and
a driver connected to the output terminal of the error amplifier and the controlling terminal of the first power switch.

7. The universal input switching power supply as claimed in claim 6, wherein the signal detecting unit comprises two voltage detectors connected to the corresponding PFC controllers of the two PFC circuits and each of the voltage detectors comprises:
a low pass filter connected to the corresponding full bridge rectifier;
a comparator having two inputs and an output, wherein one of the two inputs is connected to the low pass filter and the other input is connected to a first referenced voltage;
an electronic switch having a controlling terminal connected to the output of the comparator; and
a voltage divider connected to the storage capacitor and the ground of the corresponding PFC circuit and having a first resistor and a second resistors connected together in series, wherein a serial connecting node of the first and second resistors is connected to the electronic switch through a serial resistor and connected to one input terminal of the error amplifier of the PFC controller of the corresponding PFC circuit.

8. The universal input switching power supply as claimed in claim 6, wherein the physical wiring and controlling unit comprises:
a first electric switch connected to the ground of one of the PFC controlling unit and the output of the other PFC controlling unit;
a second electric switch connected to the outputs of the two PFC circuits;
a third electric switch connected to the grounds of the two PFC circuits; and
a processor connected to one of the voltage detectors of the signal detecting unit, a third referenced voltage and the first to third electric switches, driving the first electric switch to turn off and the second and third electric switches to turn on to connect the outputs of the two PFC circuits in parallel if the high line voltage range of the AC power source is coupled to the full bridge rectifier, and driving the first electric switch to turn on and the second and third electric switches to turn off to connect the outputs of the two PFC circuits in series if the low high line voltage range of the AC power source is coupled to the full bridge rectifier.

9. The universal input switching power supply as claimed in claim 4, wherein the physical wiring and controlling unit comprises:
a first electric switch connected to the ground of one of the two PFC controlling units and the output of the other PFC controlling unit;
a second electric switch connected to the outputs of the two PFC circuits;
a third electric switch connected to the grounds of the two PFC circuits; and a processor connected to one of the voltage detectors of the signal detecting unit, a third referenced voltage and the first to third electric switches, driving the first electric switch to turn off and the second and third electric switches to turn on to connect the outputs of the two PFC circuits in parallel if the high line voltage range of the AC power source is coupled to the full bridge rectifier, and driving the first electric switch to turn on and the second and third electric switches to turn off to connect the outputs of the two PFC circuits in series if the low high line voltage range of the AC power source is coupled to the full bridge rectifier.

10. The universal input switching power supply as claimed in claim 8, wherein the processor of the physical wiring and controlling unit comprises a comparator and an inverter, wherein the comparator comprises:
   two inputs of the comparator of the processor respectively connected to the serial connecting node of the voltage divider of the voltage detector and the third referenced voltage; and
   an output of the comparator of the processor connected to the first electric switch and connected to the second and third electric switches through the inverter.

11. The universal input switching power supply as claimed in claim 9, wherein the processor of the physical wiring and controlling unit comprises a comparator and an inverter, wherein the comparator comprises:
   two inputs of the comparator of the processor respectively connected to the serial connecting node of the voltage divider of the voltage detector and the third referenced voltage; and
   an output of the comparator of the processor connected to the first electric switch and connected to the second and third electric switches through the inverter.

12. The universal input switching power supply as claimed in claim 8, wherein the processor of the physical wiring and controlling unit comprises a comparator and an inverter, wherein the comparator comprises:
   two inputs of the comparator of the processor respectively connected to the low pass filter of the voltage detector and the third referenced voltage; and
   an output of the comparator of the processor connected to the first electric switch and connected to the second and third electric switches through the inverter.

13. The universal input switching power supply as claimed in claim 9, wherein the processor of the physical wiring and controlling unit comprises a comparator and an inverter, wherein the comparator comprises:
   two inputs of the comparator of the processor respectively connected to the low pass filter of the voltage detector and the third referenced voltage; and
   an output of the comparator of the processor connected to the first electric switch and connected to the second and third electric switches through the inverter.

14. The universal input switching power supply as claimed in claim 10, wherein each of the first to third electric switches is a relay.

15. The universal input switching power supply as claimed in claim 11, wherein each of the first to third electric switches is a relay.

16. The universal input switching power supply as claimed in claim 12, wherein each of the first to third electric switches is a relay.

17. The universal input switching power supply as claimed in claim 13, wherein each of the first to third electric switches is a relay.

* * * * *